United States Patent
McDonald

(10) Patent No.: US 6,999,850 B2
(45) Date of Patent: Feb. 14, 2006

(54) SENSORS FOR ROBOTIC DEVICES

(76) Inventor: Murray McDonald, 8/177 Beavers Road, Northcote, 3070, Victoria (AU)

( * ) Notice: Subject to any disclaimer, the term of this patent is extended or adjusted under 35 U.S.C. 154(b) by 45 days.

(21) Appl. No.: 10/467,902

(22) PCT Filed: Nov. 16, 2001

(86) PCT No.: PCT/AU01/01486

§ 371 (c)(1),
(2), (4) Date: Aug. 8, 2003

(87) PCT Pub. No.: WO02/39868

PCT Pub. Date: May 23, 2002

(65) Prior Publication Data

US 2004/0117064 A1     Jun. 17, 2004

(30) Foreign Application Priority Data

Nov. 17, 2000  (AU) ...................................... PR1544

(51) Int. Cl.
*G06F 19/00* (2006.01)

(52) U.S. Cl. ....................... 700/245; 700/249; 318/567; 318/568.12; 318/568.16; 318/568.17; 318/587; 901/1; 901/46; 901/47; 701/210

(58) Field of Classification Search ................ 700/245, 700/249; 318/567, 568.12, 568.16, 568.17, 318/587; 701/210; 901/1, 46, 47
See application file for complete search history.

(56) References Cited

U.S. PATENT DOCUMENTS

| | | | |
|---|---|---|---|
| 4,954,952 A | * | 9/1990 | Ubhayakar et al. .......... 700/264 |
| 4,964,062 A | * | 10/1990 | Ubhayakar et al. .......... 700/249 |
| 5,309,592 A | | 5/1994 | Hiratsuka |
| 5,712,961 A | | 1/1998 | Matsuo |
| 5,787,545 A | * | 8/1998 | Colens ......................... 15/319 |
| 5,991,951 A | | 11/1999 | Kubo et al. |
| 6,076,226 A | | 6/2000 | Reed |

(Continued)

FOREIGN PATENT DOCUMENTS

DE            269336 A1     6/1989

(Continued)

OTHER PUBLICATIONS

Rude, A flexible, shock-absorbing bumper system with touch-sensing capability for autonomous vehicles, 1996, IEEE, pp. 410-417.*

(Continued)

*Primary Examiner*—Thomas G. Black
*Assistant Examiner*—McDieunel Marc
(74) *Attorney, Agent, or Firm*—Edwin D. Schindler

(57) ABSTRACT

A robotic device having a body with an upper surface resiliently connected to a lower surface and having a bump sensor including a contact point on the lower surface, which contact pint is in its normal position when centrally located within a sensor device, which is an aperture having a conducting inner periphery, which sensor device is located in the upper surface of the robotic device, so that a bump on the upper surface is detected by the robotic device when the contact point abuts the aperture conducting inner periphery. The robotic device also includes a drop sensor for use in association with the lower surface of the robotic device with the lower surface having a periphery around which a plurality of drop sensors are located, with each drop sensor including a body located therein, a movably vertically oriented member, so that when any such member becomes positioned over a drop in terrain, the vertically oriented member will drop downwardly and trigger the production of a signal which is sensed by the robotic device.

15 Claims, 3 Drawing Sheets

U.S. PATENT DOCUMENTS

| | | | |
|---|---|---|---|
| 6,690,134 B1 * | 2/2004 | Jones et al. | 318/567 |
| 6,741,054 B1 * | 5/2004 | Koselka et al. | 318/445 |
| 6,781,338 B1 * | 8/2004 | Jones et al. | 318/567 |
| 6,809,490 B1 * | 10/2004 | Jones et al. | 318/568.12 |
| 2004/0093650 A1 * | 5/2004 | Martins et al. | 901/1 |
| 2004/0207355 A1 * | 10/2004 | Jones et al. | 318/568.12 |

FOREIGN PATENT DOCUMENTS

| | | |
|---|---|---|
| JP | 08-152916 | 6/1996 |

OTHER PUBLICATIONS

Rude et al., Collisions need not be dangerous for elliptical and flexible vehicles, 1997, IEEE, pp. 1277-1281.*

Mascaro et al., A reconfigurable holonomic omnidirectional mobile bed with unified seating (RHOMBUS) for bedridden patients, 1997, IEEE, pp. 12771282.*

Ross, Standard technologies of the seattle robotics society, 2004, Internet, pp. 1-10.*

* cited by examiner

SENSORS FOR ROBOTIC DEVICES

TECHNICAL AREA

This invention relates to sensor devices for robotic and autonomous machines and, in particular, to sensors for determining obstacles and hazards in both the horizontal and vertical.

BACKGROUND TO THE INVENTION

Robotic machines may be used for a number of purposes but for assistance and easy description of the invention we will consider the machine being used in association with a self mobile vacuum cleaner.

Such machines have a means to cause them to operate in various directions and have a computer system associated therewith whereby the machine can remember which parts of a room it has cleaned and also it is necessary for the machine to be able to note when it strikes an obstruction, partly to be able to move away from the obstruction at the time but also so as to avoid the obstruction in the future whilst still cleaning the remainder of the floor.

The types of obstructions can be both solid obstructions on the floor, such as pieces of furniture, walls or incursions into the room of such things as benches or the like and can also be "negative" obstructions such as a stair or step down which the machine will fall if not stopped.

As far as the positive instructions are concerned there have previously been proposed various forms of bump sensors or object detection sensors for a robotic device however these are usually of a remote sensing type, which are usually IR or RF sensors, and which tend to be associated with complicating the electronics of the device and can be quite expensive.

OUTLINE OF THE INVENTION

It is a first object of the invention to provide in a robotic device, bump sensors which are simple in construction but reliable and robust in use which can control the necessary movement of the device and, at the same time, provide a required signal to enable the memory of the device to navigate it as required.

A second object of the invention is to provide a robot device having sensors which can identify when the surface upon the robot is moving changes to prevent the robot, for example, falling down stairs and which, again, can give a good indication for future reference to avoid the problem again.

The invention in a first aspect is a robotic device having a body having an upper surface resiliently connected to a lower surface and having a bump sensor including a contact point on the lower surface which contact point is centrally located in its normal position within a sensor device being an aperture having a conducting inner periphery which sensor device is located in the upper surface such that a bump on the upper surface is detected by the robotic device when the contact point abuts the aperture periphery.

It is preferred that the robotic device detect a bump by means of an electrical signal generated when the contact point touches the sensor device. It is further preferred that the conducting inner periphery of the sensor device consist of a multiplicity of contact points, or switch segments, so that a computer device within the robotic device, said device having a memory, can determine the location of the bump on the robotic device.

While an electrical contact is the preferment here it is envisaged other signals such as infrared and pneumatic could be used.

It is also preferred that the upper surface be a plate device which rests on a plurality of ball transfers affixed to a plate device comprising the lower surface. By this means the upper plate is free to move relatively to the lower plate by a distance equal to the difference in radius of the upper and lower plate. It is therefore preferred that the upper plate have a greater diameter than the lower plate.

It is further preferred that the upper and lower surfaces each be located within housings such that the entire unit comprises the body of the robotic device. It is also preferred that the upper plate be rigidly connected to its housing while the lower plate is attached to a drive mechanism which includes a locomotion means such as wheels.

The invention in a second aspect is a drop sensor for use in association with a lower surface of a robotic device, said lower surface having a periphery around which a plurality of such drop sensors are located, each drop sensor including a body having moveably located therein a vertically oriented member such that when any such member becomes positioned over a drop in terrain the vertically oriented member will drop down and trigger the production of a signal which is sensed by the robotic device.

It is preferred that the signal is an interruption to the passage of light between at least one LED and receptor. The signal used however may be of any kind which is considered appropriate alternatively any switching system desired could be used.

It is preferred that the signal cause the robotic device to change direction away from the drop.

It is also preferred that the vertically oriented members used in the drop sensors take the form of rods. It is further preferred that these rods be able to resume their original positions within the drop sensors once the robotic device has returned to substantially level terrain.

The rods may preferably comprise armatures of solenoids and on operation of the solenoid the rods are caused to be raised. While this method is preferred it is envisaged that any retraction method, including pneumatic means may be used.

In order that the invention may be more readily understood we shall describe by way of non limiting embodiment a robotic device which incorporates both aspects of the invention therein with reference to the accompanying drawings.

BRIEF OUTLINE OF THE DRAWING FIGURES

Figure 1:
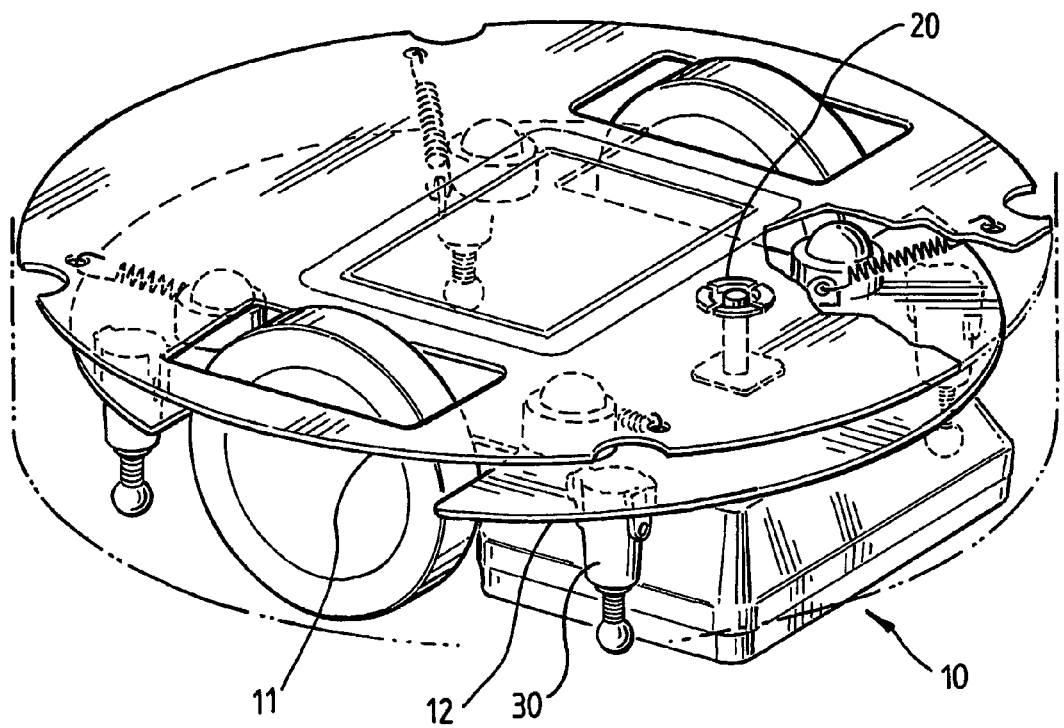
FIG. 1 shows a schematic drawing of the interior of a robotic device.
Figure 2:
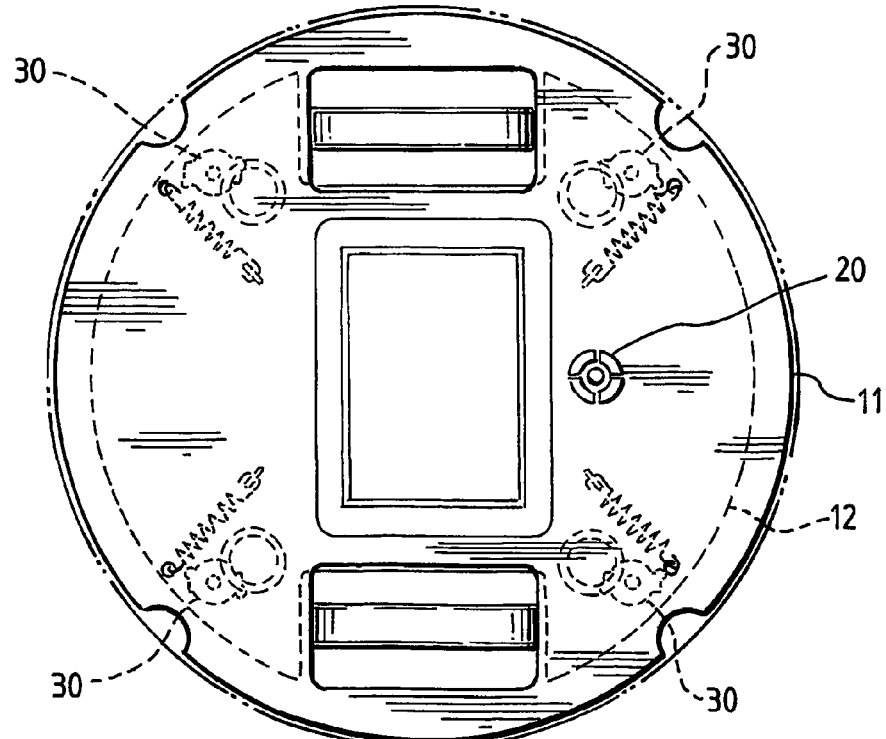
FIG. 2 shows an upper view of the interior of a robotic device.
Figure 3:
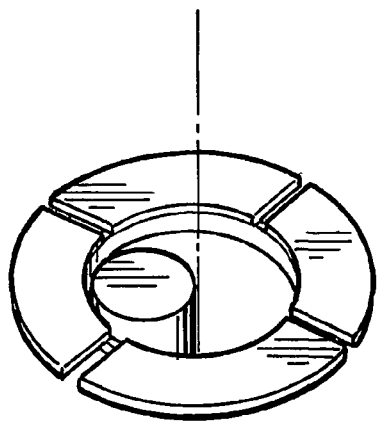
FIGS. 3,4 and 5 show the components of the bump sensor of the invention.
Figure 4:
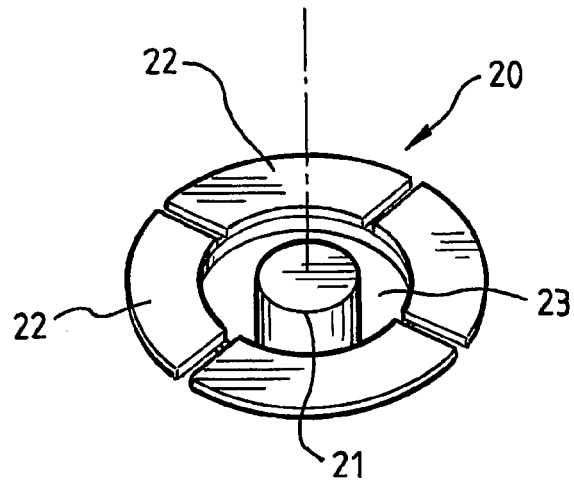
Figure 5:
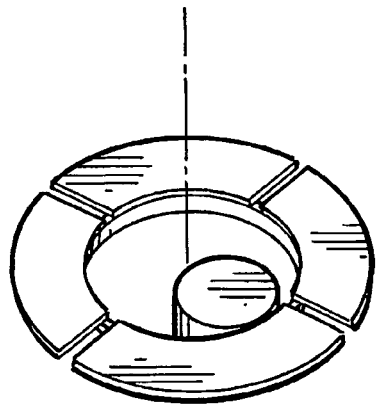
Figure 6:
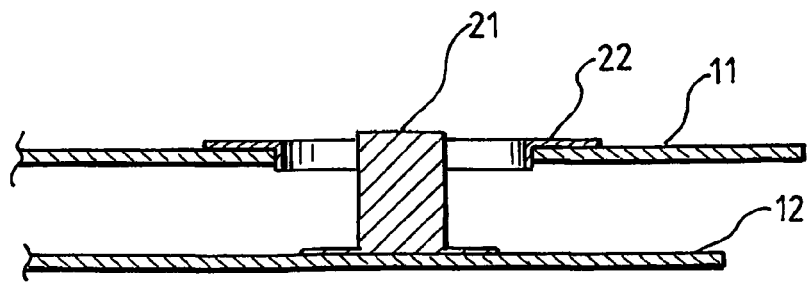
FIG. 6 shows a cross-section through the components of the bump sensor.

FIG. 1 shows the interior of a robotically controlled cleaning device 10 having an upper surface or plate 11, in which the bump sensor 20 is shown (FIG. 2),. Drop sensors 30 are shown arranged around the lower periphery of the lower surface or plate 12.

In its complete form the cleaning device has a body which includes a chassis and drive wheels.

The robotic device has an outer shell rigidly attached to the upper plate 11. The upper plate rests on multiple transfer balls that are affixed to the lower plate 12 and these plates are able to move relative to one another whilst supported by these transfer balls. The upper plate has a greater diameter than the lower plate and is able to move relatively to by a distance equal to the difference between the radii of the two plates when the robotic device is bumped.

There are also provided spring means which keep the upper plate centered over the lower plate when no contact is made between an object and the outer shell of the robotic device.

The bump sensor 20 which detects any bump activity includes a contact member 21 mounted fixedly on lower plate 12 and extending through aperture 23 in upper plate 11. The periphery of this aperture is surrounded by conducting segments 22 each of which is identifiable by a computer device associated with the robotic device.

The arrangement is such that movement of the upper plate 11 caused by the robotic device hitting some object causes the contact member 21 to hit one of the conducting segments 22 and a signal to be generated which the robotic device's computer recognizes and permits the location of the bump to be identified Subsequent to encountering an impediment to movement the actual movement of the device can be controlled by software however various modes of movement can be used.

If required, the software associated with the device can map the position of an obstacle in memory.

It will be seen that the device can if required move in a more or less random appearing manner throughout the room and, if associated with a vacuum cleaner, the vacuum cleaner will effectively clean the room as it passes over an area.

The walls of the room would provide an obstruction and if a wall is struck effectively head on then after the machine is reversed somewhat and again commences to move this movement will tend to be parallel to the wall.

In another arrangement the robotic device can strike a wall, rotate through 90°, move along the wall a distance half its diameter, turn again through 90° and proceed back across a floor thereby systematically cleaning it if the robotic device is a cleaning robot.

Clearly any range of movement can be programmed into such a device, it is unique however in terms of the use of the bump sensor. It can be seen that the bump sensor of the device is basically simple, we find it quite satisfactory to use only four (4) segments but if it was required a greater number than this, preferably eight (8) but possibly six (6) could be used, the more sensors which are used the more delicate the manoeuvring can be to cover the area as quickly as possible.

Figure 7:
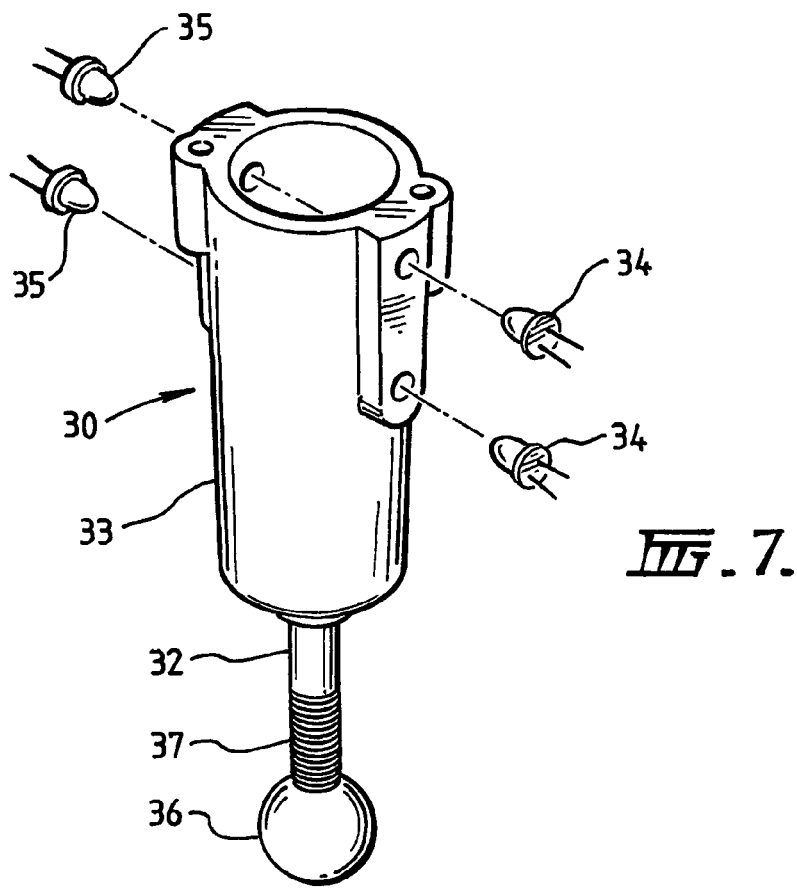
FIG. 7 shows the drop sensor of the invention in its lowered state.
Figure 8:
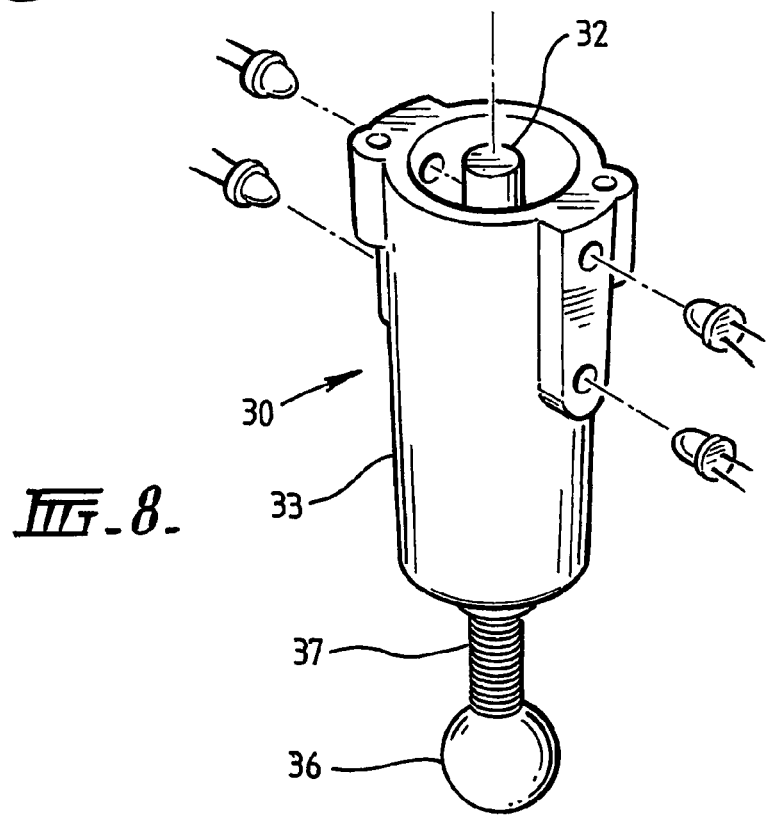
FIG. 8 shows the drop sensor in the raised position.

In the second aspect of the invention we provide drop sensors 30 as shown in FIGS. 7 and 8 to ensure that the device does not "fall" down stairs or, say a step in the middle of a split level room.

There may be four (4) such sensors, although if required there could be more, and these each comprise a rod member 32 mounted for vertical movement within a body 33 of the device which rod members may have a rounded lower end or preferably a ball 36 of a relatively low friction material, such as nylon attached to their lower ends. In the embodiment of the invention shown the lower part of the rod member, adjacent ball 36, consists of a tightly wound coil 37 to lend flexibility to this part of the drop sensor.

The rods themselves are preferably of iron or steel and pass upwardly through the windings of solenoid.

Also are two pairs 34 of LED's and two phototransistors 35 the arrangement being such that when the robotic device is moving over even terrain and the rod member 32 is in its elevated position (FIG. 8) a first LED/receptor pair is occluded while light transfer is continuous across a second pair. Should the drop sensor pass over a stair or other change in terrain the rod member falls to the position shown in FIG. 7 and the second LED/receptor pair becomes occluded while the first opens. It is not pertinent which pair is which however this approach provides a simple means of determining when a drop has been reached as a signal is sent to the device's computer.

When the computer receives the signal it can stop the robot and the solenoid becomes energised and causes the rod member 32 to be retracted thereby passing the LED/receptor pairs to be returned to their original state. The robotic device meanwhile will know that it is free to move away from the step.

Once the movement of the device is stopped, the solenoid is energised so that the rod and the ball are raised to no longer extend below the level of the device, the drive motors are commenced to cause the device to move at 180° to its initial movement until the device will have cleared the edge of the step, the solenoids can then be released and the rod or rod members dropped into contact with the surface, the drive wheels are manipulated to turn the device through a predetermined angle and then it commences to move along that line.

If, say, this movement is not such as to cause it to move away from the step or the like then it is possible that one of the rods on the side of the device will pass over the edge, the operation is repeated, the forward movement is stopped, the rod is raised by operation of the solenoid, the device moves rearwardly by a distance sufficient to ensure that it has cleared the step, it is caused to rotate through a predetermined angle, the solenoid can be released so that the rod comes into contact with the ground and forward movement is again effected.

Again, should this be required, the operating computer of the system can note where the rod dropped over the edge so as to avoid contact with the edge during further movement.

It will be seen that the sensors provided in this way are basically very simple, the solenoid permits the sensor to be removed from any likelihood of contact with the edge of the obstruction and the movement of the device is relatively rapidly reestablished and the cleaning, assuming it be a vacuum cleaner, continued.

Whilst in this specification we have described two aspects of the invention it will be appreciated that they both effect the same function, although under different circumstances.

The bump sensors operate when the shell of the device contacts an obstruction, the segmented switch is caused to move relative to the main chassis of the device, electrical contact is made and once this occurs, the remainder of the operation occurs automatically.

The stair sensitive rods cause effectively an identical operation if they drop downwardly, as when they pass over the edge of a step, the only difference being the additional step of causing the rod members to rise by use of a solenoid so that they clear a drop before the robotic device moves.

Whilst simple sensors for providing information concerning various obstacles to a robotic device have been described herein it is envisaged that these could be distributed around the machine as desired and that any modification in their mechanical arrangement will not depart from the scope of the invention.

The claims defining the invention are as follows:

1. A robotic device, comprising:
a lower surface;
means for producing a signal detectable by said robotic device; and,
a plurality of drop sensors located around a periphery of said lower surface, each drop sensor of said plurality of drop sensors comprising a body having a vertically oriented member movably located within said body, so that any said vertically oriented member of any said drop sensor of said plurality of drop sensors becomes positioned over a drop in terrain, said vertically oriented will drop downwardly from a first position to a second position to trigger, in said second position, said means for producing a signal detectable by said robotic device.

2. The robotic device according to claim 1, wherein said means for producing a signal detectable by said robotic device is a signal caused via an interruption to a light beam between at least one LED and one LED receptor.

3. The robotic device according to claim 1, wherein said vertically oriented member of each said drop sensor is a rod member.

4. The robotic device according to claim 3, further comprising means for permitting each said rod member to resume its said first position within said drop sensor, means for signalling said robotic device to return to substantially level terrain and means for returning said robotic device to substantially level terrain.

5. The robotic device according to claim 4, wherein said means for returning said robotic device to substantially level terrain comprises a solenoid.

6. The robotic device according to claim 4, wherein said means for returning said robotic device to substantially level terrain comprises a pneumatic device.

7. A robotic device, comprising:
a body having an upper surface and a lower surface, said upper surface being resiliently connected to said lower surface and having a bump sensor with a contact point on said lower surface;
a first sensor device located in said upper surface and being an aperture having a conducting inner periphery, with said contact point of said bump sensor being in a normal position centrally located within said first sensor device, so that a bump on said upper surface is detectable by said robotic device when said contact point of said bump sensor abuts said conducting inner periphery of the aperture of said first sensor device;
means for producing a signal detectable by said robotic device; and,
a second sensor device comprising a plurality of drop sensors located around a periphery of said lower surface, each drop sensor of said plurality of drop sensors comprising a body having a vertically oriented member movably located within said body, so that any said vertically oriented member of any said drop sensor of said plurality of drop sensors becomes positioned over a drop in terrain, said vertically oriented will drop downwardly from a first position to a second position to trigger, in said second position, said means for producing a signal detectable by said robotic device.

8. The robotic device according to claim 7, further comprising means for generating an electrical signal when said contact point touches said first sensor device for detecting a bump on said upper surface.

9. The robotic device according to claim 7, wherein said conducting inner periphery of said first sensor device includes a plurality of contact points for determining a location of a bump against said robotic device.

10. The robotic device according to claim 9, wherein said plurality of contact points is a plurality of switch segments.

11. The robotic device according to claim 7, further comprising means for moving said upper surface relative to said lower surface.

12. The robotic device according to claim 7, wherein said upper surface is a first plate resting on a plurality of ball transfers affixed to a second plate comprising said lower surface.

13. The robotic device according to claim 12, wherein said first plate is movable relative to said second plate by a distance equal to any difference in radius of said first plate and of said second plate.

14. The robotic device according to claim 7, further comprising a housing having a greater diameter than said lower surface with, at least, said upper surface being located within said housing.

15. The robotic device according to claim 7, further comprising a drive mechanism having means for locomotion, with said lower surface being attached to said drive mechanism and able to move via said means for locomotion.

* * * * *